United States Patent
Walston

(10) Patent No.: US 7,885,182 B2
(45) Date of Patent: Feb. 8, 2011

(54) METHOD FOR FAST RECOVERY FROM RING PROTECTION SWITCHES ON DOCSIS NETWORKS

(75) Inventor: Robert A. Walston, Atlanta, GA (US)

(73) Assignee: ARRIS Group, Inc., Suwanee, GA (US)

( * ) Notice: Subject to any disclaimer, the term of this patent is extended or adjusted under 35 U.S.C. 154(b) by 1391 days.

(21) Appl. No.: 11/130,287

(22) Filed: May 16, 2005

(65) Prior Publication Data

US 2005/0254417 A1    Nov. 17, 2005

Related U.S. Application Data

(60) Provisional application No. 60/571,263, filed on May 14, 2004.

(51) Int. Cl.
*G01R 31/08* (2006.01)
(52) U.S. Cl. ....................................... 370/222
(58) Field of Classification Search ................ 370/216, 370/222, 242, 245, 230, 235, 229, 252
See application file for complete search history.

(56) References Cited

U.S. PATENT DOCUMENTS

| | | | | |
|---|---|---|---|---|
| 5,784,569 A | * | 7/1998 | Miller et al. | 709/235 |
| 5,844,889 A | * | 12/1998 | Takatsu et al. | 370/223 |
| 6,414,765 B1 | * | 7/2002 | Li et al. | 398/5 |
| 6,745,339 B2 | * | 6/2004 | Shoaib et al. | 714/1 |
| 6,760,316 B1 | * | 7/2004 | Hebsgaard et al. | 370/324 |
| 6,768,722 B1 | * | 7/2004 | Katseff et al. | 370/260 |
| 6,791,995 B1 | * | 9/2004 | Azenkot et al. | 370/436 |
| 7,023,798 B2 | * | 4/2006 | Bourlas et al. | 370/230 |
| 7,248,561 B2 | * | 7/2007 | Ishibashi et al. | 370/228 |
| 2006/0120282 A1 | * | 6/2006 | Carlson et al. | 370/229 |

* cited by examiner

*Primary Examiner*—Kwang B Yao
*Assistant Examiner*—Anh Ngoc Nguyen
(74) *Attorney, Agent, or Firm*—Troy A. Van Aacken

(57) ABSTRACT

The range delay of each of a plurality of user devices of an HFC is monitored. If the delay of a number of devices shifts by about the same amount and at about the same time, then the number of devices having such a shift is compared to a predetermined threshold. If the number exceeds the threshold, it is assumed that a leg of a fiber ring in the HFC has been severed, and a ring switch is determined to have occurred.

Upon this determination, granting of bandwidth requests to a group of user devices is suspended, and a ranging and register process for all devices in the group begins. The group may comprise all user devices affected by the broken fiber ring. Following ranging and registering, granting of bandwidth requests to the affected devices begins according to a normally-provisioned request grant schedule.

8 Claims, 3 Drawing Sheets

METHOD FOR FAST RECOVERY FROM RING PROTECTION SWITCHES ON DOCSIS NETWORKS

CROSS REFERENCE TO RELATED APPLICATION

This application claims priority under 35 U.S.C. 119(e) to U.S. provisional patent application No. 60/571,263 entitled "Method for fast recovery from ring protection switches on DOCSIS networks," which was filed May 14, 2004, and is incorporated herein by reference in its entirety.

FIELD OF THE INVENTION

This invention relates, generally, to communication networks and devices and, more particularly, to system operation when a transport line, or connection, is severed, or otherwise interrupted.

BACKGROUND

Data-Over-Cable Service Interface Specifications ("DOCSIS") has been established by cable television network operators to facilitate transporting data traffic, primarily internet traffic, over existing community antenna television ("CATV") networks. In addition to transporting data traffic as well as television content signals over a CATV network, multiple services operators ("MSO") also use their CATV network infrastructure for carrying voice, video on demand ("VoD") and video conferencing traffic signals, among other types.

In transporting downstream multimedia content, as well as data, an upstream message, or messages, is/are typically sent to request the content and to set up a service flow to deliver the content. In addition to downstream multimedia content, such as video, voice traffic also uses message signaling to set up service flows for the upstream and downstream directions.

These signals are typically sent over a fiber network to a location, sometimes referred to as a node, near an end user, and from the node to a broadband user's device via a coaxial cable. Such an arrangement is known in the art as a hybrid fiber coaxial network ("HFC"). An HFC network may be designed for redundancy by configuring portions in rings. Thus, from any one point to another that is connected by a ring, there are two routes a signal can take in traveling between one point and another. This provides redundancy inasmuch as if the ring is severed at a point along a given route, signals that were traveling along that route can be rerouted from their origination point to destination point in the other direction.

As known in the art, broadband user devices, also referred to as customer premise equipment devices, such as, for example, DOCSIS cable modems, DOCSIS media terminal adaptors ("MTA"), embedded MTA ("EMTA"), or DOCSIS set top gateway devices, undergo a process commonly referred to as ranging and registering upon start-up. During this process, the distance along the route connecting a modem, or modems, to a central device, such as a cable modem termination system ("CMTS"), is determined and stored. This distance is used for timing purposes to regulate when a given device can transmit so that collisions do not occur between multiple modems using the same channel to communicate with the CMTS. Accuracy and precision in determining the correct distance between the modem and the CMTS is important to prevent interference, or collision, as referred to in the art, between traffic signals of the modems.

When a portion of a network ring is severed, the distance between the modem and the CMTS changes when a ring protection switch occurs. A ring protection switch re-routes traffic that was using the now-severed portion so that the same traffic flows over an intact portion. However, the distance, and thus signal delay, between modems subject to the ring protection switch and the CMTS, is altered. Thus, even though there is a back-up path for modems to use instead of the route having the severed portion, the distance for such modems will almost assuredly be changed. This affects a change in the time for a signal to reach the CMTS, and the modems that were connected to the CMTS via the severed link typically undergo the range and register process again, which induces a perceptible service interruption for the users of these modems while the modems are restarting/rebooting. Furthermore, when one or more modems continue to transmit under the assumption that the old range delay is still in effect, the ability of other modems to properly re-range and re-register is negatively impacted.

Thus, there is a need in the art for a method and system for improving operation and decreasing the recovery time of a modem that is ranging and registering following a network incident, such as a line break in a fiber ring of an HFC network.

SUMMARY

A method and system reduces the recovery time of a network of user devices served by a central device following a network incident. In the preferred embodiment, the central device is typically a CMTS, which is connected to a plurality of customer premise equipment devices via a HFC network. This reduction in recovery time is accomplished by monitoring the range delay for each user device and determining whether the range delays of a number of user devices exceeding a predetermined threshold have shifted by about the same amount of time. In the preferred embodiment, the predetermined threshold is set at about 25% of the total number of user devices served by the CMTS. Alternatively, other numbers of devices can be used as the threshold.

In addition, a determination is made whether the range delay shifts of the user devices occurred at about the same time. If it is determined that there is a number of user devices for which their respective range delay times have shifted by about the same amount, and that the shift for these range delay times occurred at about the same time, then the central device assumes that the range delay shifts are the result of a ring protection switch. A ring protection switch is a type of incident that occurs upon breaking a leg, or route, of a fiber ring connecting a node to the CMTS. Traffic that was once carried over the broken leg of the ring is carried over the other leg.

Upon determination of this assumption that a ring protection switch occurred, the granting of bandwidth requests to a group of user devices connected to the central device is suspended and a ranging operation for all user devices connected to the central device is performed. Following suspension of bandwidth request grants to the group and then performance of the ranging operation for devices of the group, bandwidth requests are again granted to the group of user devices. The group may be all user devices connected the CMTS, or a subgroup of all user devices.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
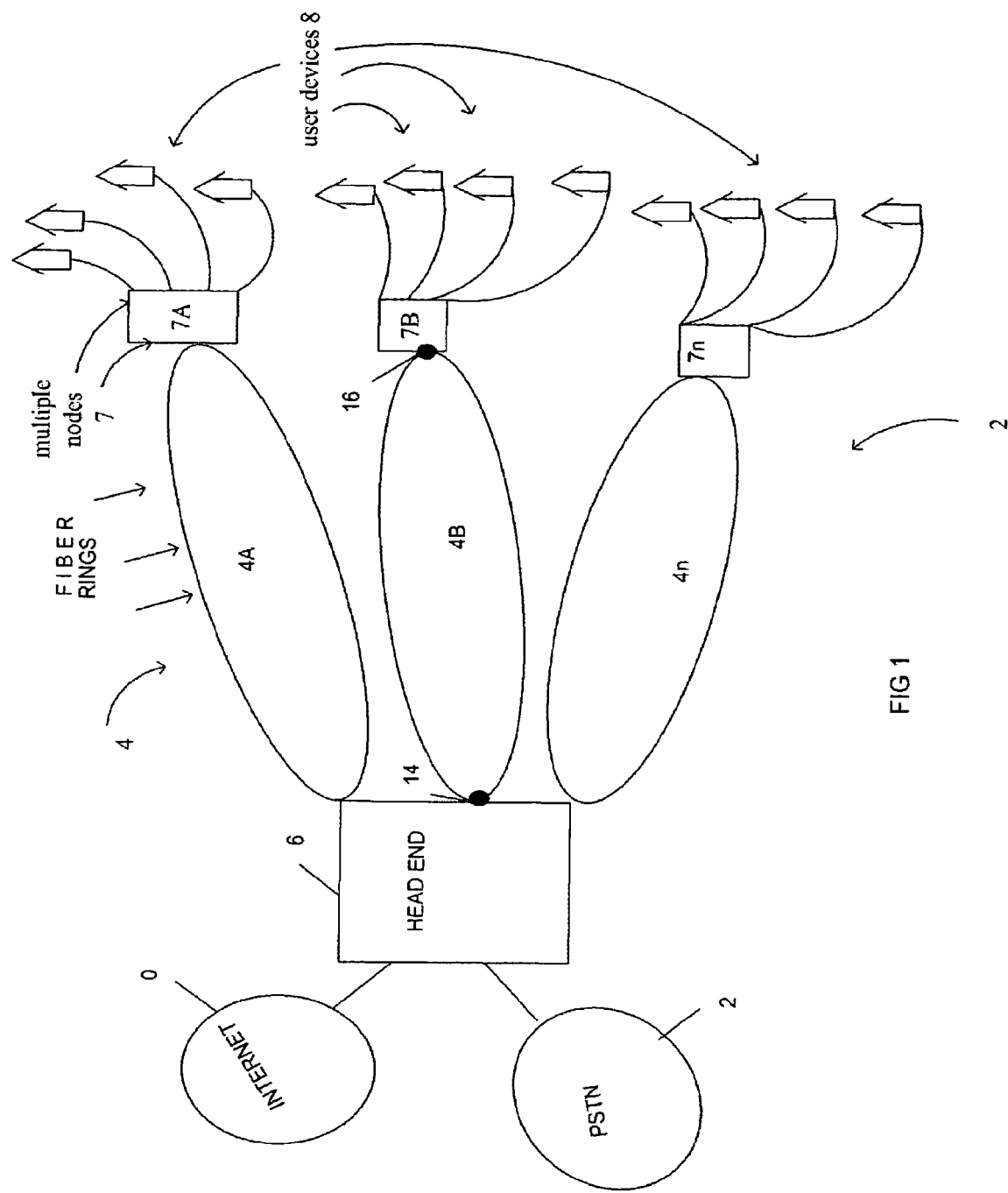
FIG. 1 illustrates an HFC network connecting a head end to multiple nodes.

Turning to the figures, FIG. 1 illustrates HFC network system 2, including fiber rings 4, for connecting a head end 6 to multiple nodes 7. Head end 6 is the central processing location for traffic to and from users 8, and typically provides a gateway for the users to the internet 10 and public switched network 12, as well as other networks not shown, such as a video server or online gaming server. Rings 4 provide redundant paths between head end 6 and the corresponding nodes to which they connect. For example, in reference to ring 4B, the ring connects head end 6 to node 7B between point 14 at the head end and point 16 at the node. Thus, ring 4B forms two paths, also referred to as routes or legs, between points 14 and 16, so that if one path becomes broken, the other provides an alternate path. Although rings 4 in the figure are shown as essentially oval in shape, it will be appreciated that the rings may be physically/geographically of any shape, with various components in between points 14 and 16. However, the term ring is used, and the rings 4 are depicted, to illustrate the electrical characteristics and architecture of the rings.

Figure 2:
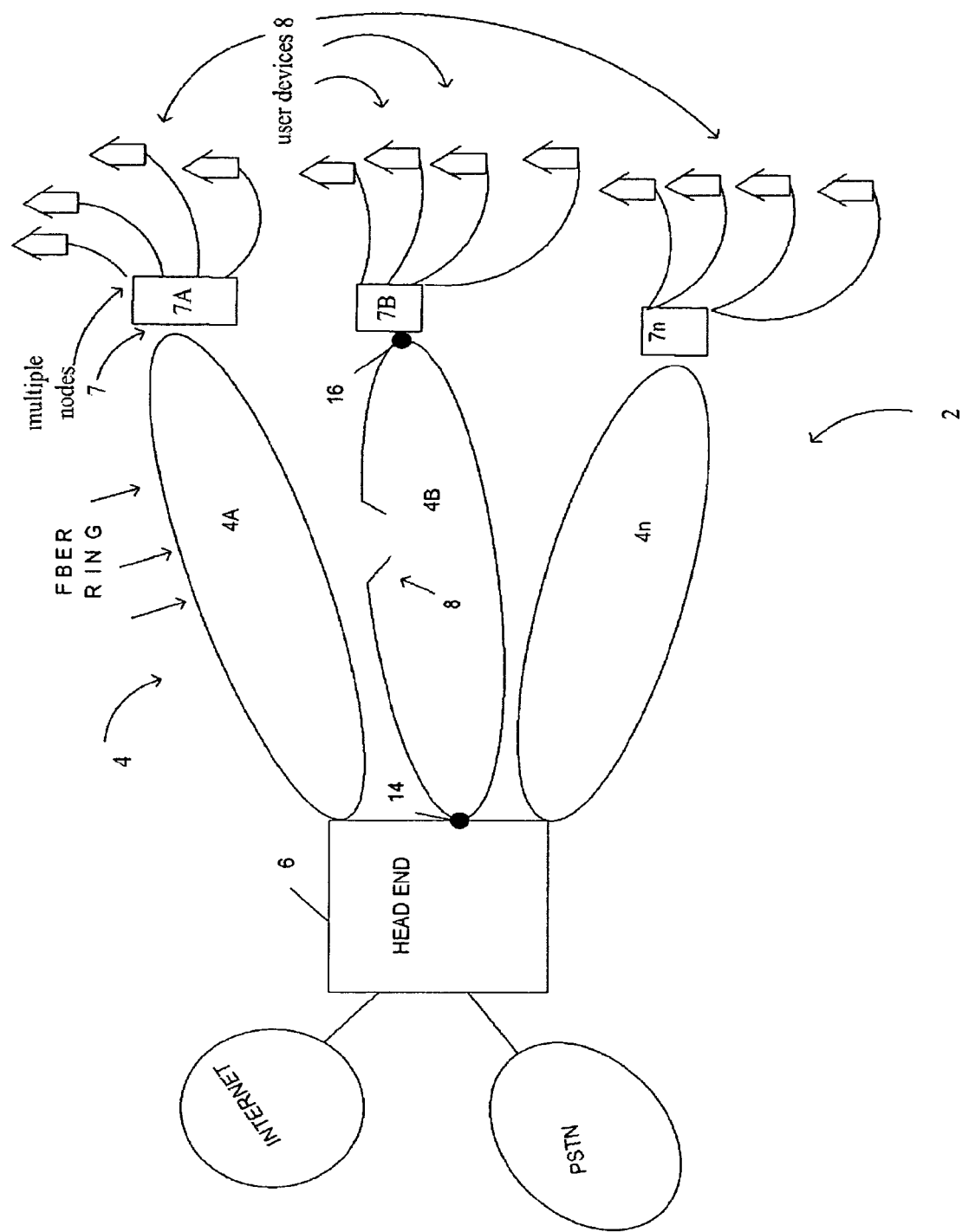
FIG. 2 illustrates an HFC network wherein a fiber ring has been severed.

Turning now to FIG. 2, system 2 shown is similar to the system shown in FIG. 1, but the upper leg of ring 4B has been severed at break 18. Thus, traffic that was traveling along the upper leg between point 16 at node 7B and point 14 at head end 6 now travels along the lower leg. As discussed above, since the rings 4 are depicted graphically as rings, but are typically of other shapes, the distance between points 14 and 16 along the upper path (in which break 18 is depicted) will usually, if not always, be different from the distance between points 14 and 16 along the lower path. Thus, the time for signals to traverse one path will usually, if not always, be different from the time to traverse the other.

It will be appreciated that in an unbroken ring, traffic typically flows in the same direction around the ring. Thus, when a ring is healthy and unbroken, upstream traffic may flow for example, between point 16 and point 14 along the upper path of ring 7B. Downstream traffic, therefore, would travel from point 14 to point 16 along the lower leg of ring 7B. When both upstream and downstream traffic between points 14 and 16 flows in the unbroken lower leg of ring 7B, then downstream traffic is also affected by break 18 in the upper leg of ring 7B.

Since the time it takes for a signal to traverse between points 16 and 14—this time being referred to as the range delay for a given modem—is used by the CMTS located at head end 6 to schedule upstream traffic from the plurality of users 8, the CMTS must always know what the delay time is for each user device, such as a cable modem. If the CMTS determines that the delay time of multiple users conducting station maintenance changes by approximately the same amount simultaneously, then the CMTS implements corrective action to update the corresponding delay times, and stores the delay times into a memory corresponding to the associated user device. It will be appreciated that station maintenance is a term known in the art, and thus this standard process is used to monitor the range delay times of the various user devices 7.

Figure 3:
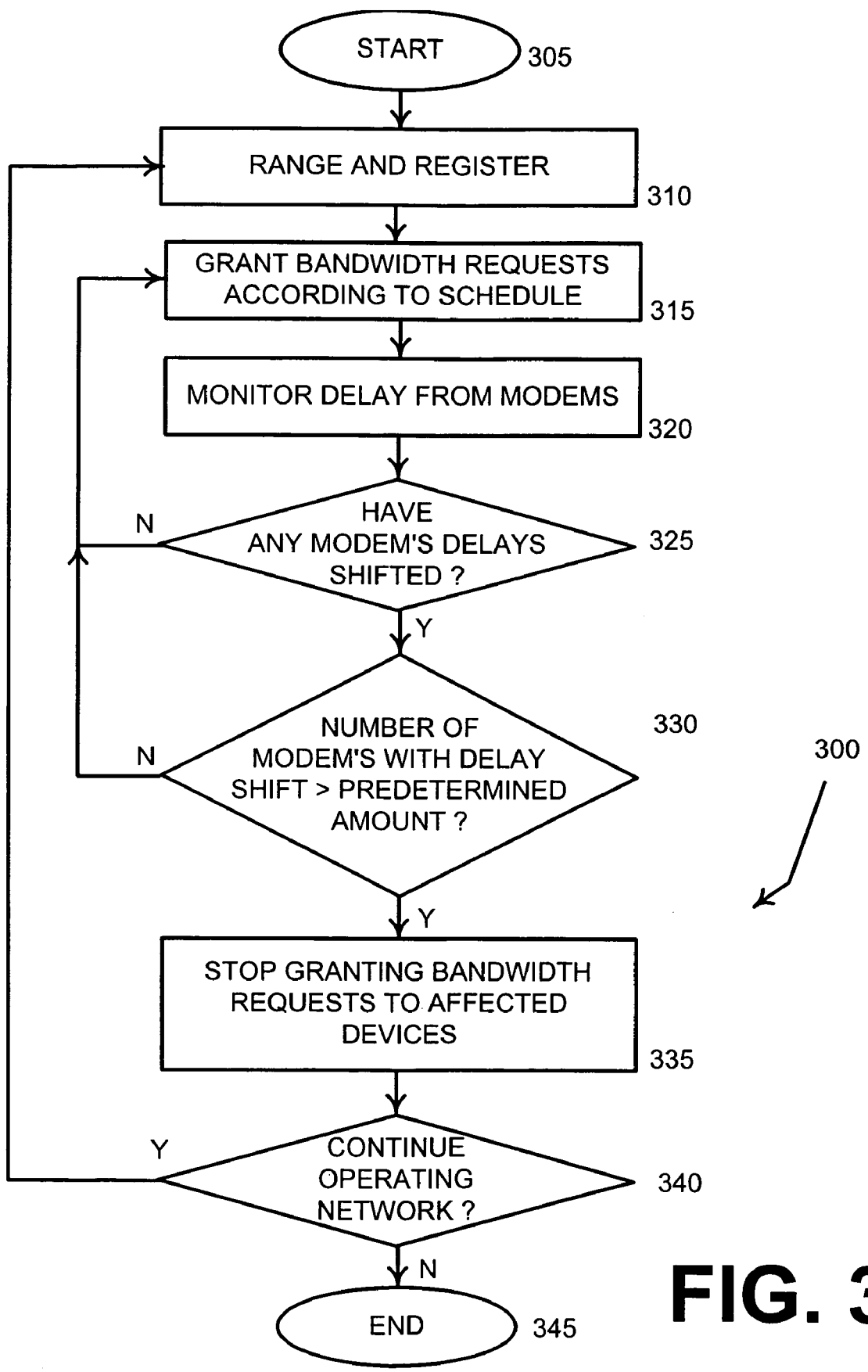
FIG. 3 illustrates a flow diagram the steps for providing fast recovery of a break in a network ring connection.

A method that maintains the range delay times of network user devices, modems for example, is illustrated in the flow diagram of FIG. 3. Method 300 starts at step 305 and the user devices range and register at step 310. Ranging and registering is a process known in the art and need not be discussed in further detail. Bandwidth requests are granted at step 315 to requesting modems according to a schedule that depends on priority, order of request, and other parameters known in the art. At step 320, the CMTS monitors upstream traffic from the modems, including bandwidth requests and station maintenance traffic, to ensure the range delay of a signal traversing from a given cable modem matches what it should be based on information generated and stored during the ranging and registering process at 310.

If the CMTS determines at step 325 that no shift, or change, of range delay time corresponding to any of the modems being monitored has occurred, the process returns to step 315 and continues granting bandwidth requests according to the normal schedule. If, however, the CMTS determines at step 325 that range delay shifts have occurred, then the process advances to step 330 and the number of modems with range delay time shifts is determined. If the number of modems with range delay times that have shifted exceeds a predetermined threshold, preferably, for example, 25% of the number of modems connected to a given node, then it is assumed that a line break in a fiber ring has occurred. This is a reasonable assumption because from time to time, the range delay time (s) of one or more particular modem(s) may drift due to temperature changes, electrical component fatigue, electrical power supply voltage changes, etc. However, if the number of modems for which a delay shift simultaneously occurs is equal to or greater than the preferred predetermined threshold of 25% of the number of modems served by a single node, then it is presumed likely that a leg of the ring was severed and that transmission of traffic has shifted from the broken leg of the ring to the other leg. It will be appreciated that the predetermined threshold of 25% of the number of modems connected to a node is given as a preferred threshold, but that other threshold levels may be used as deemed appropriate by MSO personnel.

If at step 330 it is determined that the number of modems for which a range delay time shift has occurred is fewer than the predetermined threshold number, process 300 returns to step 315 and the CMTS continues to grant bandwidth requests to modems for which a delay shift has not occurred—modems that have incurred a range delay shift may undergo individual re-ranging and re-registering. However, if the number is greater than the predetermined threshold number, then process 300 continues to step 335, and all bandwidth requests are denied. At step 335, the temporary withholding, or suspending, of bandwidth request grants may be applied to those modems connected to the node corresponding to the severed fiber ring, for example node 7B as shown in the figure.

After the granting of requests to modems connected to node served by a severed ring has been suspended at step 335, a determination is made whether to continue operation of the network at step 340. This determination may be based on whether it appears that a ring switch has occurred, or if some other, possibly more widespread incident affecting much or all of the network, such as, for example, a large power outage affecting all or most of the nodes, has occurred. If the latter is the case, then the process proceeds to step 345 and ends so that proper maintenance and repair can proceed.

If it is determined that operation of the network should continue following a perceived ring protection switch occurrence as determined at step 330, then process 300 proceeds to step 310, so that ranging and registering can be performed for modems connected to the network. Preferably, only user devices/modems connected to the node affected by the ring protection switch should undergo ranging and registering again, but it will be appreciated that there may be scenarios under which it is desirable for more or less than the modems connected to the node affected by the ring protection switch to undergo ranging and registering.

It will also be appreciated that since all bandwidth request opportunities are halted at step 335, substantially all—it may be desirable to continue providing a small number of bandwidth request data grants—upstream bandwidth resource data grants of the CMTS assigned to the affected node and associated modems are available to quickly perform the range and register process of all affected modems. Thus, although block 310 in the figure broadly represents the ranging and registering process, and this process may be applied to all user devices during normal operation according to typical operational provisioning, the process represented by block 310 is preferably applied to the user devices affected by a ring protection switch following the occurrence of a ring protection switch event/incident.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A computer-implemented method for reducing recovery time of a number of user devices served by a central device following a network incident, comprising: monitoring a range delay for each user device from the central device;

determining whether a number of user devices, for which each of said user devices' respective range delay has shifted by approximately the same amount of time and for which the shift occurred at approximately the same time, exceeds a predetermined threshold;

suspending the granting of bandwidth requests from the central device to a group of user devices associated with the number of devices for which the shift has occurred if the determined number of user devices exceeds the predetermined threshold;

allocating substantially all upstream data grants from the central device for ranging and registering to the group of user devices; and performing ranging and registering for the group of user devices.

2. The method of claim 1 wherein the user devices are DOCSIS customer premise equipment devices.

3. The method of claim 1 wherein the central device is a CMTS.

4. The method of claim 1 wherein the predetermined threshold is approximately 25% of user devices connected to a node of the network affected by a ring protection switch.

5. The method of claim 1 further comprising granting bandwidth requests to the group of user devices following performance of ranging for said group of user devices.

6. The method of claim 1 wherein the network incident is a break in a fiber ring connecting a node to the CMTS and a ring protection switch operation is applied to the fiber ring serving said node.

7. The method of claim 6 wherein the group of user devices to which the granting of bandwidth requests is suspended includes all of the user devices connected to a node corresponding to the ring protection switch.

8. The method of claim 7 wherein the group of user devices to which the granting of bandwidth requests is suspended includes all of the user devices connected to the CMTS through one or more nodes.

* * * * *